(12) United States Patent
Helms et al.

(10) Patent No.: US 7,390,007 B2
(45) Date of Patent: Jun. 24, 2008

(54) TOWBAR SYSTEM

(75) Inventors: James Helms, Fort Meyers, FL (US); Thomas G. Buckner, Gibsonia, PA (US)

(73) Assignee: IBIS TEK, LLC, Bulter, PA (US)

( * ) Notice: Subject to any disclaimer, the term of this patent is extended or adjusted under 35 U.S.C. 154(b) by 10 days.

(21) Appl. No.: 11/447,687

(22) Filed: Jun. 5, 2006

(65) Prior Publication Data

US 2007/0001425 A1    Jan. 4, 2007

Related U.S. Application Data

(60) Provisional application No. 60/687,984, filed on Jun. 6, 2005.

(51) Int. Cl.
*B60D 1/54*    (2006.01)

(52) U.S. Cl. ............... 280/491.4; 280/491.1; 280/491.5

(58) Field of Classification Search .......... 280/491.1, 280/491.4, 491.5, 493; 403/109.1, 377, 109.2–109.8
See application file for complete search history.

(56) References Cited

U.S. PATENT DOCUMENTS

| | | | | |
|---|---|---|---|---|
| 3,083,040 A | * | 3/1963 | Hayman et al. | ............. 280/493 |
| 3,492,022 A | * | 1/1970 | Hansen | ................... 280/478.1 |
| 4,640,523 A | * | 2/1987 | Wolmarans | ............... 280/491.4 |
| 4,861,061 A | * | 8/1989 | Frantz | .................... 280/497.2 |
| 5,516,140 A | * | 5/1996 | Hinte | .......................... 280/494 |
| 5,873,595 A | * | 2/1999 | Hinte | .......................... 280/504 |
| 5,957,477 A | * | 9/1999 | Ensz et al. | .................. 280/482 |
| 6,854,756 B1 | * | 2/2005 | Solberg | ....................... 280/482 |
| 7,029,021 B2 | * | 4/2006 | Klar | ............................ 280/482 |
| 2004/0190977 A1 | * | 9/2004 | Matern | ........................ 403/105 |
| 2005/0141953 A1 | * | 6/2005 | Chuan | ...................... 403/109.1 |
| 2006/0249926 A1 | * | 11/2006 | Smith | ....................... 280/491.1 |

* cited by examiner

*Primary Examiner*—Lesley D. Morris
*Assistant Examiner*—Maurice Williams
(74) *Attorney, Agent, or Firm*—Ware, Fressola, Van Der Sluys & Adolphson LLP (57) ABSTRACT

A towbar for flat-towing a vehicle, including two telescoping arms each pivotally attached at a pivot end having a heavy-gauge eyelet for attaching to a pintle hitch on the rear of a towing vehicle, with each arm having a gear element at the pivot end, in gear engagement with the gear element of the other arm. The telescoping arms automatically lock at a predetermined length.

6 Claims, 10 Drawing Sheets

TOWBAR SYSTEM

CROSS REFERENCE To RELATED APPLICATION

Reference is made to and priority claimed from U.S. provisional application Ser. No. 60/687,984 filed 6 Jun. 2005.

BACKGROUND OF THE INVENTION

1. Technical Field

The present invention pertains to the field of accessories for automotive vehicles. More particularly, the present invention pertains to a towbar system for towing a disabled vehicle.

2. Discussion of related art

Ordinarily, in order to tow a disabled vehicle, a tow truck is used, having specialized equipment for raising one end of the vehicle off the ground and holding onto the raised end while towing the vehicle.

In some situations, and in particular in case of military vehicles on patrol or in battle, a tow truck cannot be used. Such vehicles, however, often include on their back end a so-called pintle hitch (i.e. a type of trailer hitch) to which a towbar can be attached for flat-towing (all four wheels on the ground) another (disabled) vehicle having D-rings or other means for attaching the towbar.

In case of the U.S. Army HMMWV (High Mobility Multipurpose Wheeled Vehicle), a towbar is sometimes used including a heavy-gauge eyelet at one end—the tow-vehicle end—for attaching to a pintle hitch on the rear of the towing HMMWV, and two arms pivotally attached at the tow-vehicle end so as to allow adjusting the distance between the ends that attach to the front of the vehicle to be towed. When the towed and towing vehicle are hooked together by the towbar, the towbar can swivel around the Pintle hitch on the back of the towing vehicle.

A problem with the towbar that is sometimes used is that there is limited adjustability to accommodate the typical situation where the vehicle to be towed is not substantially lined up with the towing vehicle. The two arms of the towbar are fixed in length, and the pintle hitch and the two points of attachment must therefore form an isosocles triangle (two sides equal in length) for the towbar to be hooked up. Thus, there is sometimes quite a bit of maneuvering of the towing vehicle before the hookup can be made. In battle, such maneuvering is often impossible.

In addition, once hooked up, if the towing vehicle brakes or stops when not perfectly aligned with the towed vehicle, then the towbar swivels about the pintle hitch and ends up getting cocked at sometimes a large angle. For example, if the towing vehicle is turning to the left so that the front wheels of the towed vehicle are also turned left, and the towing vehicle then brakes to a stop, then the towed vehicle will tend to continue forward with the wheels turned to the left, with the result that the towed vehicle will end up quite close to the towing vehicle, with the towbar swiveled sometimes to its extreme limit. This puts high stresses on the equipment of the towbar and the towed vehicle. And driving out of such a cocked configuration is sometimes difficult because the front wheels of the towed vehicle are often not suitably aimed to continue following the towing vehicle.

What is needed is a towbar that is easier to hook up, and that does not cock when the towing vehicle brakes to slow or stop.

DISCLOSURE OF INVENTION

Accordingly, in a first aspect of the invention, an apparatus is provided, comprising: a coupler, for coupling to a hitch on the rear end of a towing vehicle; a pivot, attached to the coupler; two arms, each pivotally attached to the pivot at a respective pivot end, and terminating at the other end in a means for attaching to attachment points on the front of a vehicle to be towed; wherein at least one of the arms includes two members in a telescoping arrangement so as to allow varying the length of the arm.

In accord with the first aspect of the invention, the arm having a telescoping arrangement may also include means for automatically locking at a predetermined length when extended to the predetermined length.

Also in accord with the first aspect of the invention, the arm having a telescoping arrangement may also include means for automatically locking in a stowed position.

Also in accord with the first aspect of the invention, the two arms may each include a gear element at the pivot end, and the respective gear elements may engage each other so as to prevent one arm from pivoting without the other arm pivoting an equal amount.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1A:
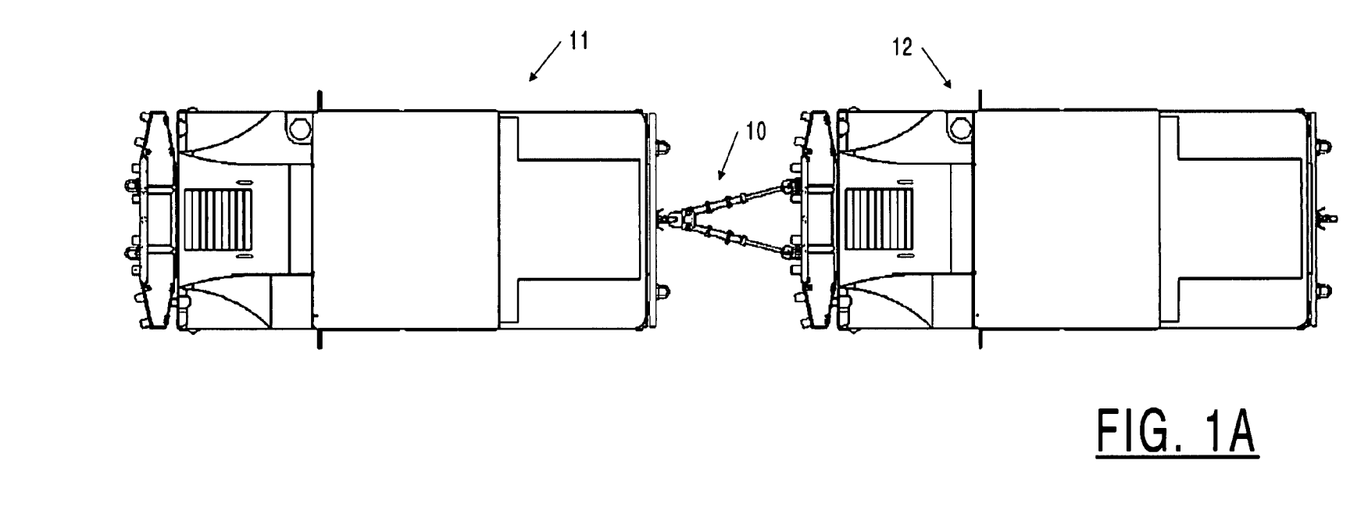
FIGS. 1A and 1B are a top view and a side view, respectively, of a towing vehicle coupled to a towed vehicle using a towbar system according to the invention, having telescoping arms in an extended and spread-apart position.
Figure 1B:
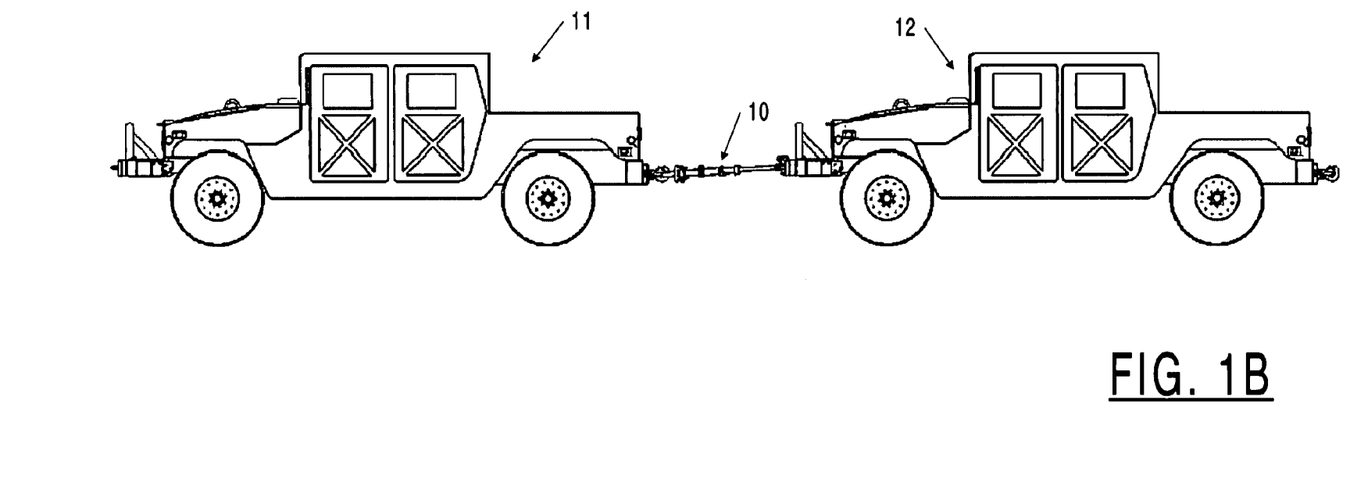

Referring now to FIG. 1A and FIG. 1B, a towbar system 10 according to the invention is shown attached to the rear end of a towing vehicle 11 and attached to the front end of a towed vehicle 12. As explained below, the towbar 12 locks into the extended configuration shown.

Figures 2A, 2B:
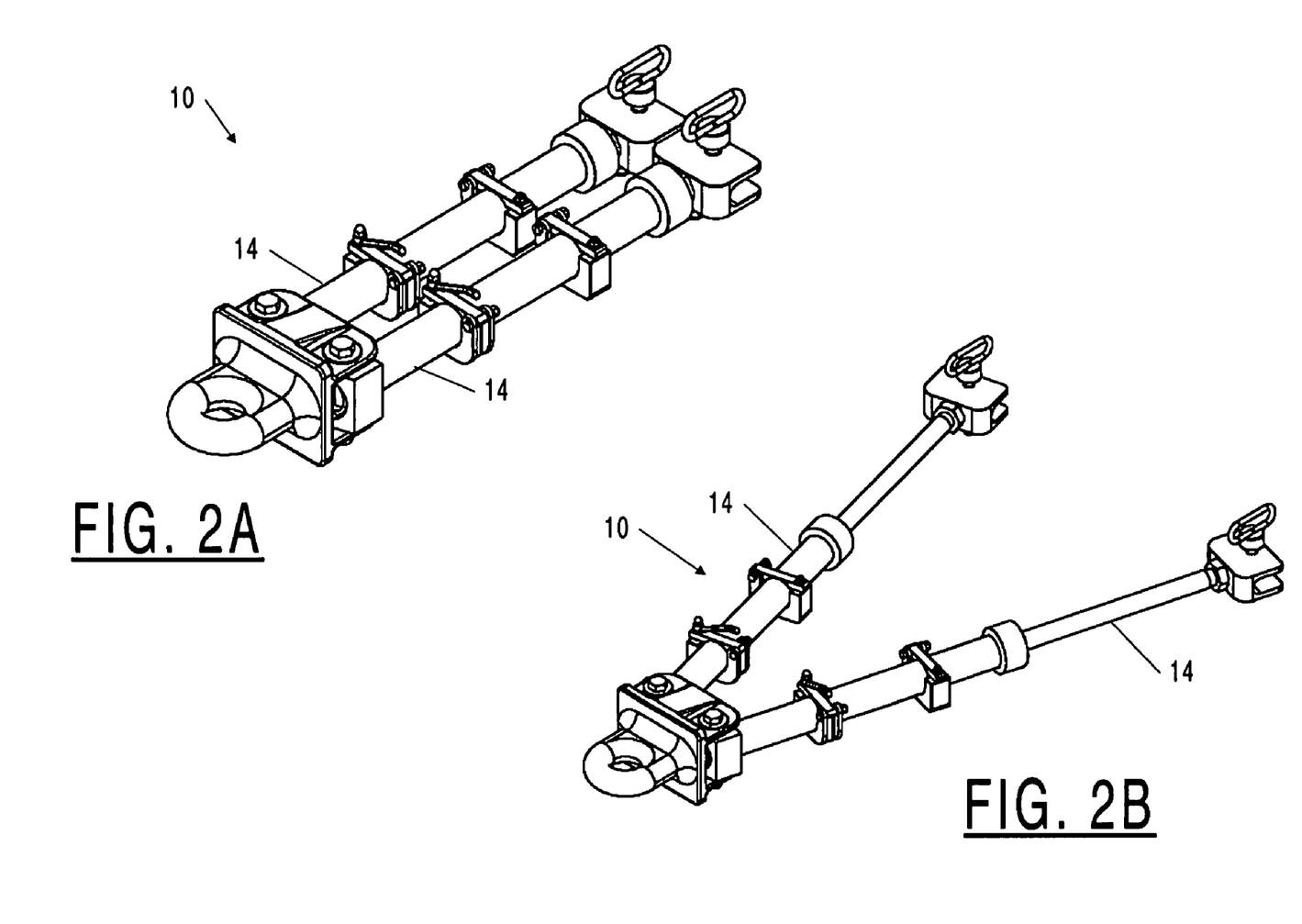
FIG. 2A is a perspective view of the towbar system in a stowed configuration, with the telescoping arms retracted and the arms pulled together.
FIG. 2B is a perspective view of the towbar system in a deployed configuration, as in FIGS. 1A and 1B.

Referring now to FIG. 2A and FIG. 2B, the towbar system is shown having telescoping arm members 14. In FIG. 2A the towbar system is shown in a stowed configuration. In FIG. 2B, it is shown with the telescoping arm members extended. The telescoping arm members 14 are independent, i.e. either one can be extended or retracted independent of the position of the other.

Figure 3A:
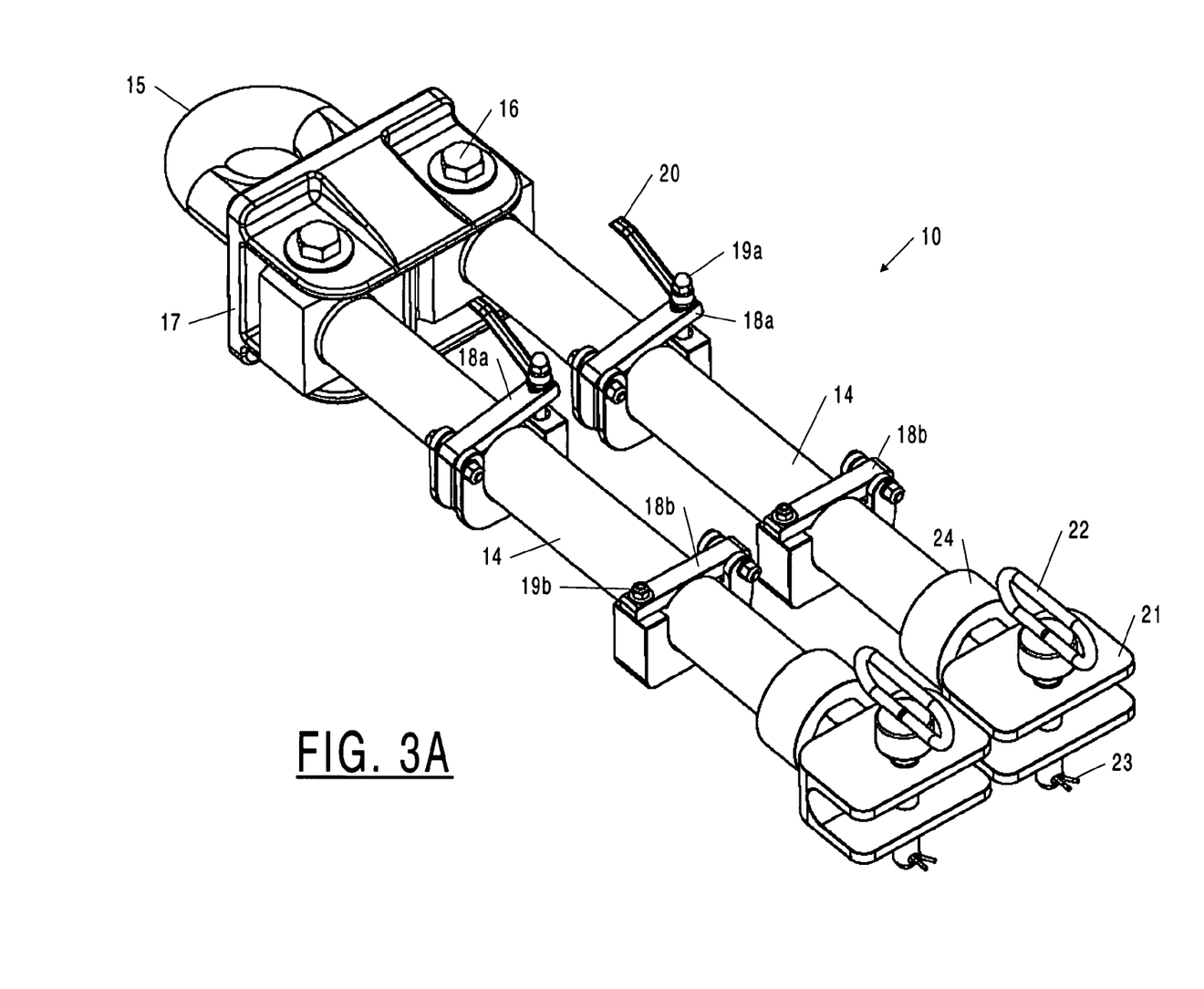
FIGS. 3A-C are different perspective views of the towbar system in the stowed configuration.
Figure 3B:
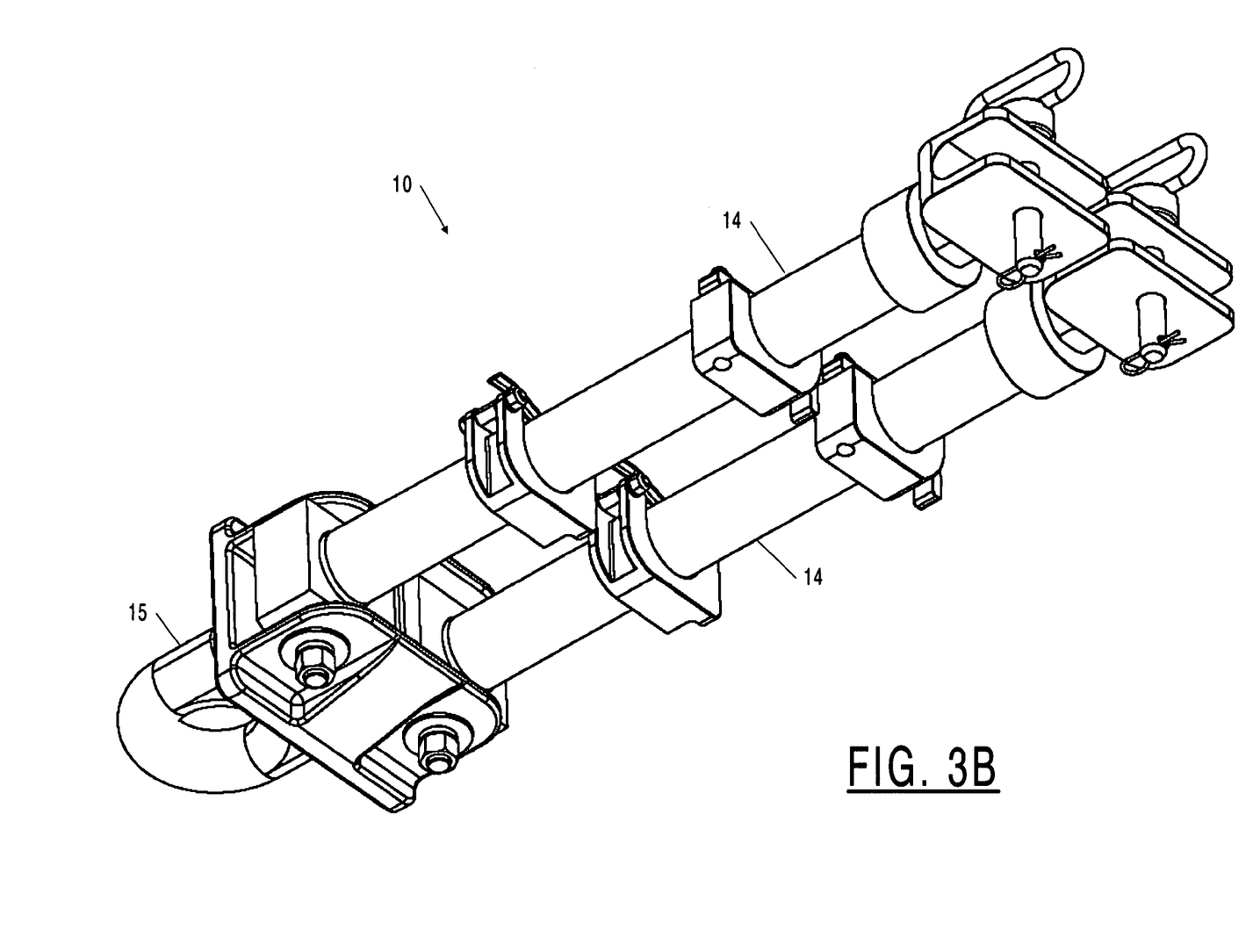
Figure 3C:
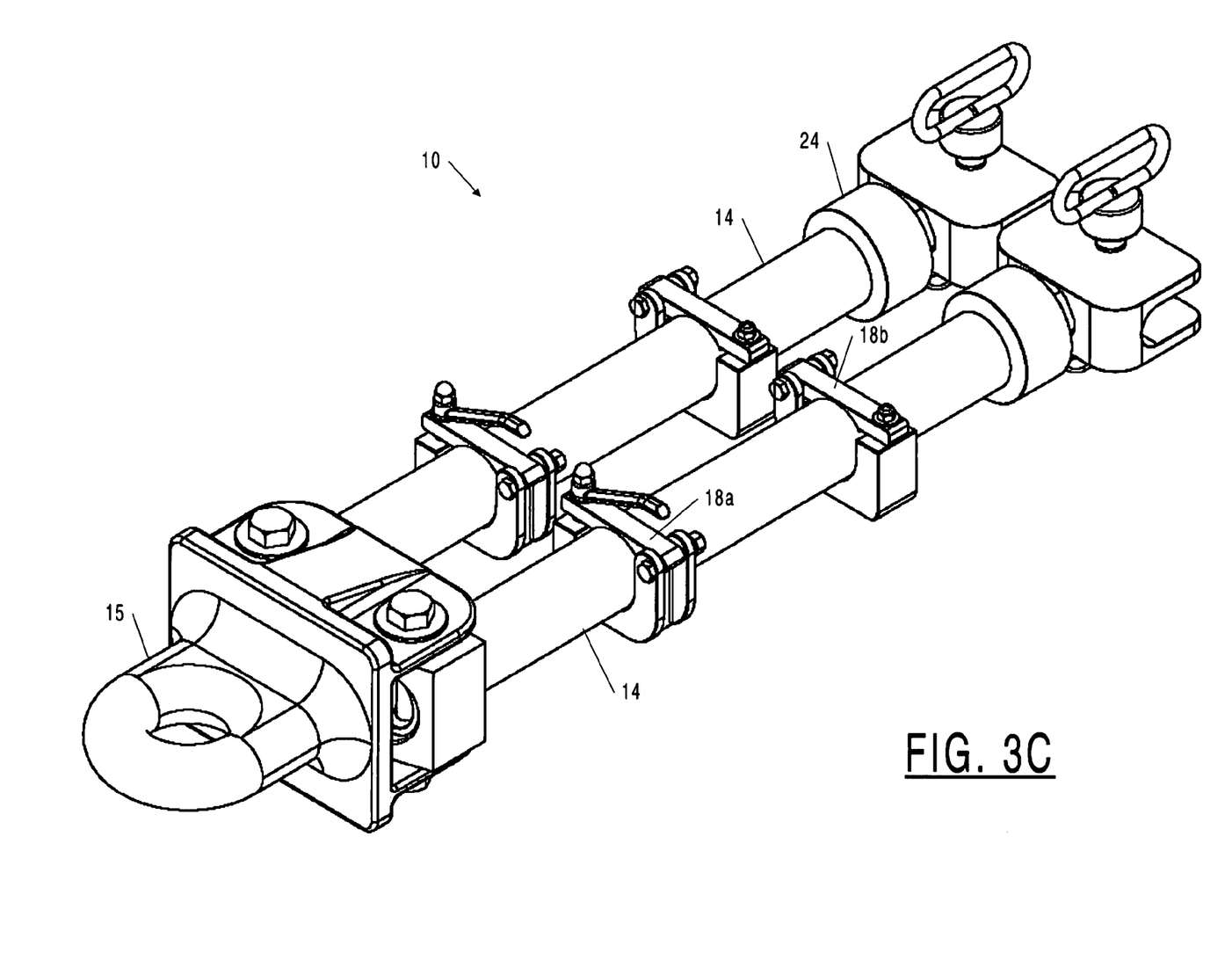
Figure 6:
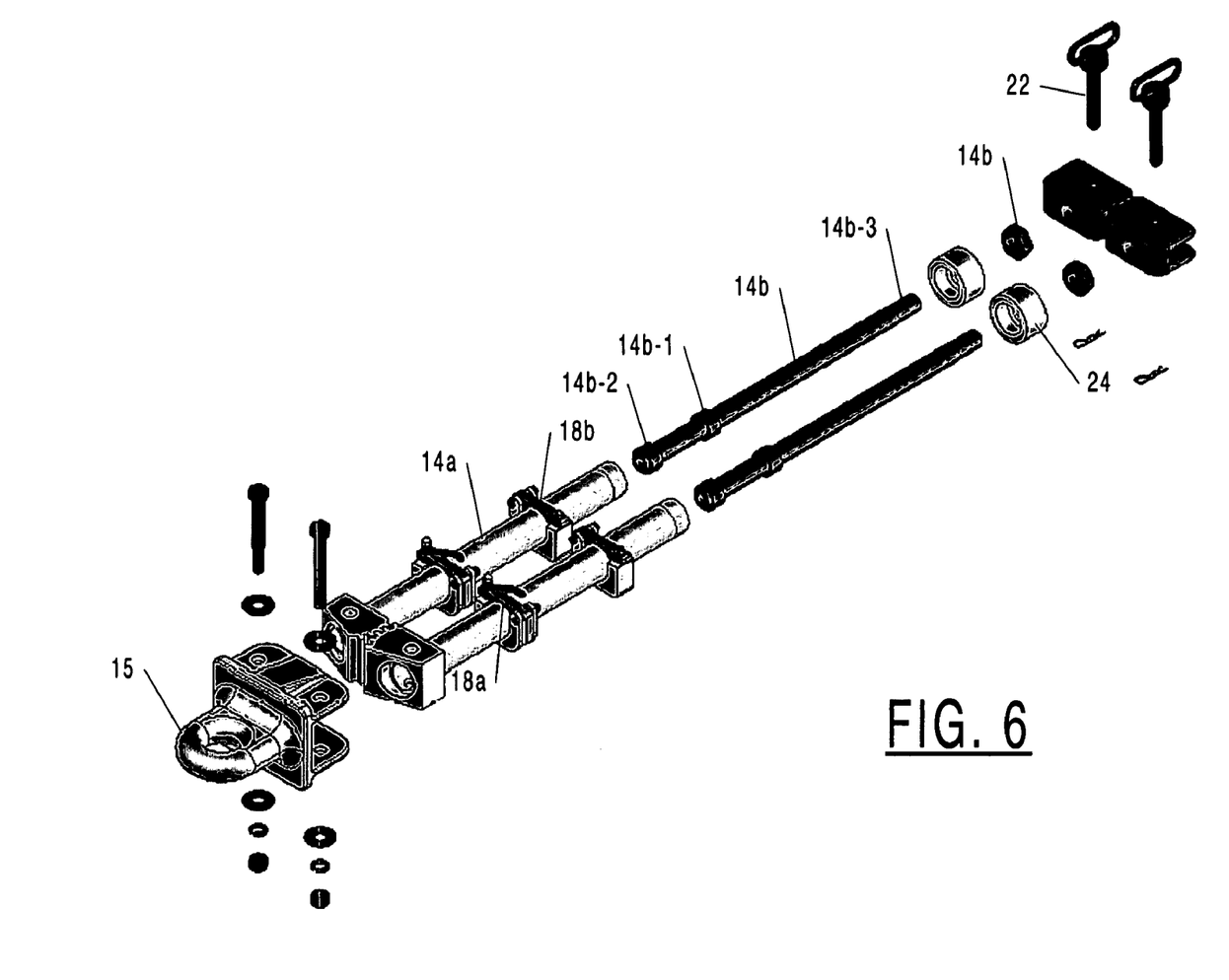
FIG. 6 is an exploded view of the towbar system.

Referring now to FIGS. 3A-C and also FIG. 6, the towbar system 10 is shown as having a heavy-gauge eyelet/ring hitch 15 at its tow-vehicle end for pivotably attaching to a pintle hitch on the rear of the towing vehicle 11 (FIGS. 1A-B). The telescoping arms 14 are in turn each pivotably attached to the eyelet via respective pivot bolts 16 through respective openings in a rear block 17 joining the eyelet—the eyelet and rear block being advantageously provided together as a (single) casting.

Figures 4A, 4B:
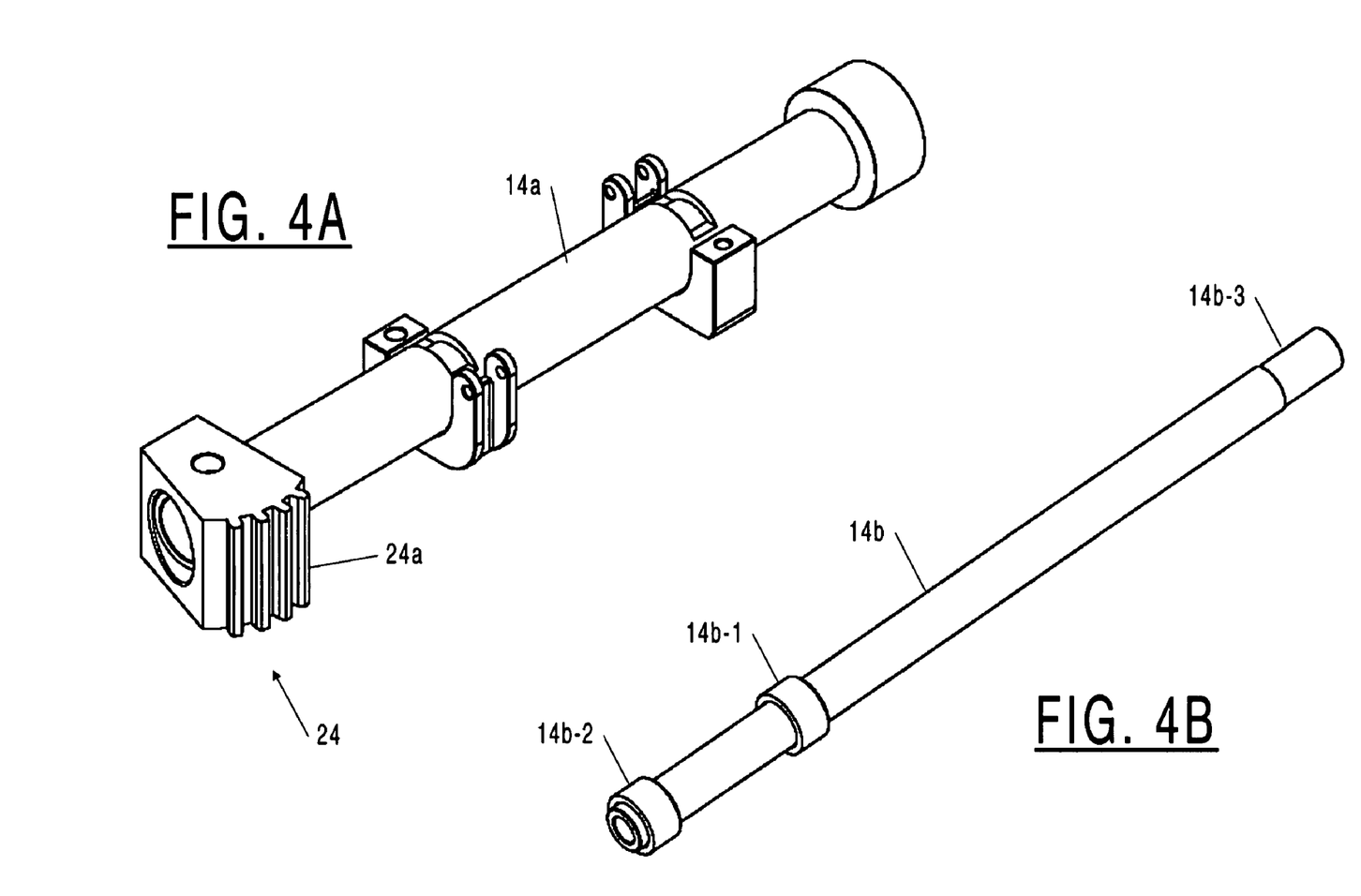
FIG. 4A is a perspective view of a tubular sleeve component of one telescoping arm.
FIG. 4B is a perspective view of a telescoping rod member component of one telescoping arm.

Referring now also to FIGS. 4A-B, each telescoping arm 14 has a tubular sleeve 14a and a telescoping rod member 14b that can be pulled so as to extend more or less from the tubular sleeve, and so make it possible to hook to a vehicle to be towed even when the vehicle is not properly aligned and positioned relative to the towing vehicle. With the invention, the two points of attachment on the vehicle to be towed and the single hitch point on the towing vehicle do not have to coincide with the vertices of an isosocles triangle, as they do for a towbar system also having two arms that do not telescope.

Still referring to FIGS. 3A-C and also to FIGS. 4A-B, the telescoping rod member 14b has two protuberances, a far-end protuberance 14b-1 and a hitch-end protuberance 14b-2, that serve to prevent the telescoping rod member from pulling all the way out of the tubular sleeve, and also prevent the rod from collapsing back into the sleeve after it is fully extended (and when, e.g. the towing vehicle brakes to slow or stop). The protuberances work in conjunction with a hitch-end lockbar 18a, a far-end lockbar 18b (nearer where the towed vehicle is hooked up), and a stop 24 at the far end, which block the protuberances from sliding past the points where the lockbars are located, depending on the direction of travel of the telescoping rod member, as described in more detail below in connection with FIGS. 5A-G. The hitch-end lockbar 18a is spring-loaded via a spring-loaded bolt 19a, so as to automatically lock down after the telescoping rod member pulls all the way to the end of its allowed range of travel. The far-end lockbar 18b is also spring-loaded via a spring-loaded bolt 19b. So when hooking up a vehicle, depending on the relative alignment and positions of the towing vehicle and the vehicle to be towed, the telescoping rod members 14b may be more or less extended to reach the hookup points on the vehicle to be towed, and when the towing vehicle then pulls away with the towed vehicle hooked up, the telescoping rod members extend to the end of their allowed range of travel (limited by the stop 24), and the far-end lockbar 18b is then urged into the locked (down) position by a spring-loaded bolt 19b. A handle 20 on each telescoping arm 14 allows an operator to manually raise the hitch-end lockbars 18a to push in and stow the telescoping rod members 14b. The far-end lockbar is also raised to allow stowing the telescoping rod member, by lifting on a portion (not shown) of the far-end lockbar 18b extending past the spring-loaded bolt 19b.

Referring now in particular to FIG. 4B and also to FIG. 6, the telescoping rod member 14b also has a necked down end portion 14b-3 with a reduced outer diameter compared to both the protuberances as well as the rest of the rod member. This portion is typically threaded to allow attaching the front end block 21.

Referring now again to FIGS. 3A-C and FIGS. 4A-B, the towbar 10 has advantageously a front block 21 on the towed-vehicle end of each telescoping arm 14, adapted to fit onto a so-called D-ring often provided on the front bumper of a HMMWV (as illustrated in FIGS. 1A-B). A coupling pin 22 for each telescoping arm 14 fits through holes in the front block, positioned so as to arrange that the hitch pin passes through the area enclosed by the D-ring, thus hooking up the tow vehicle to the vehicle to be towed. Respective cotter pins 23 hold the hitch pins in the holes.

Referring now in particular to FIG. 4A, the tow-vehicle end of each tubular sleeve 14a has gearing 24 with gear teeth 24a that engage corresponding gearing on the other tubular sleeve. In other words, each arm terminates at a pivot end in a portion of a wheel having protruding teeth, forming a gear element, and the two gear elements engage each other in a gear arrangement. The gearing prevents one telescoping arm 14 from pivoting without the other telescoping arm 14 pivoting an equal amount. As a result, the above-mentioned cocking is prevented.

Figure 5A:
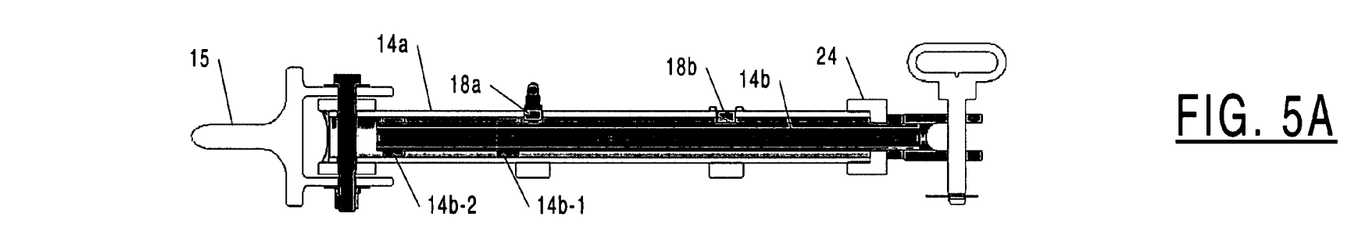
FIG. 5A-G are cutaway views illustrating the telescoping action of one telescoping arm.
Figure 5B:
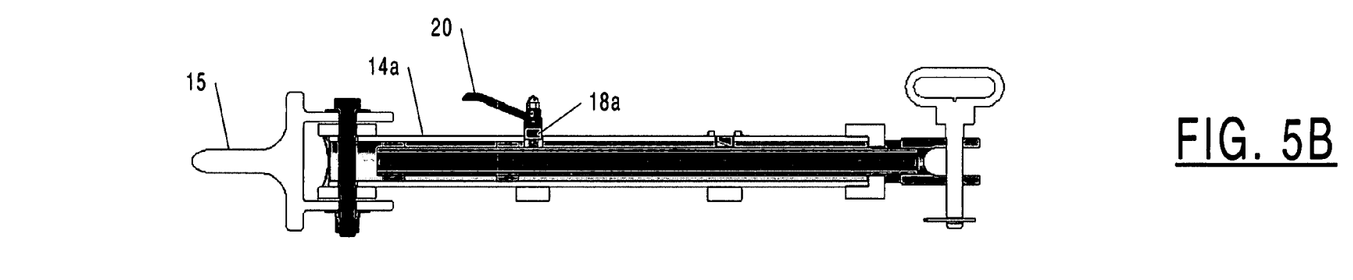
Figure 5C:
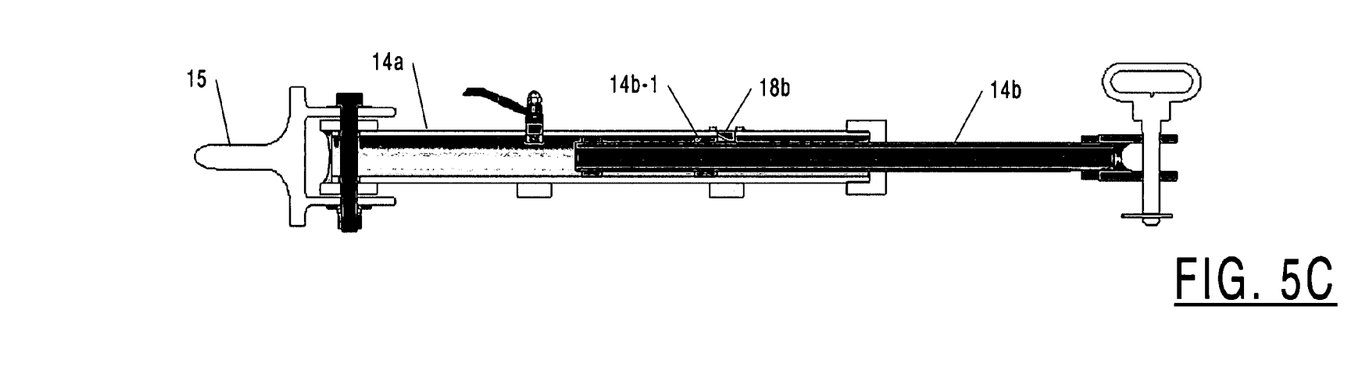
Figure 5D:
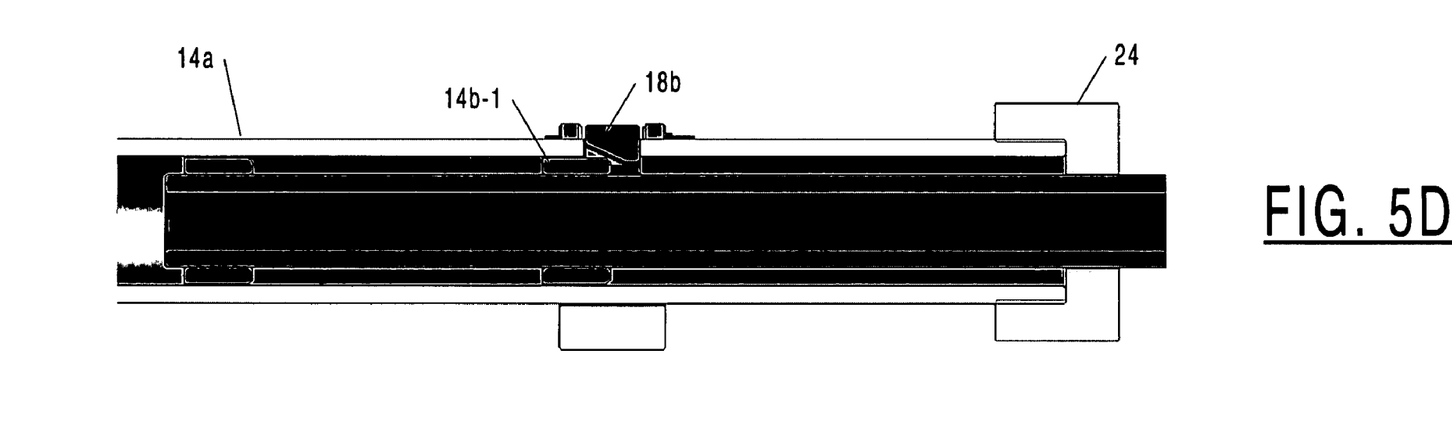
Figure 5E:
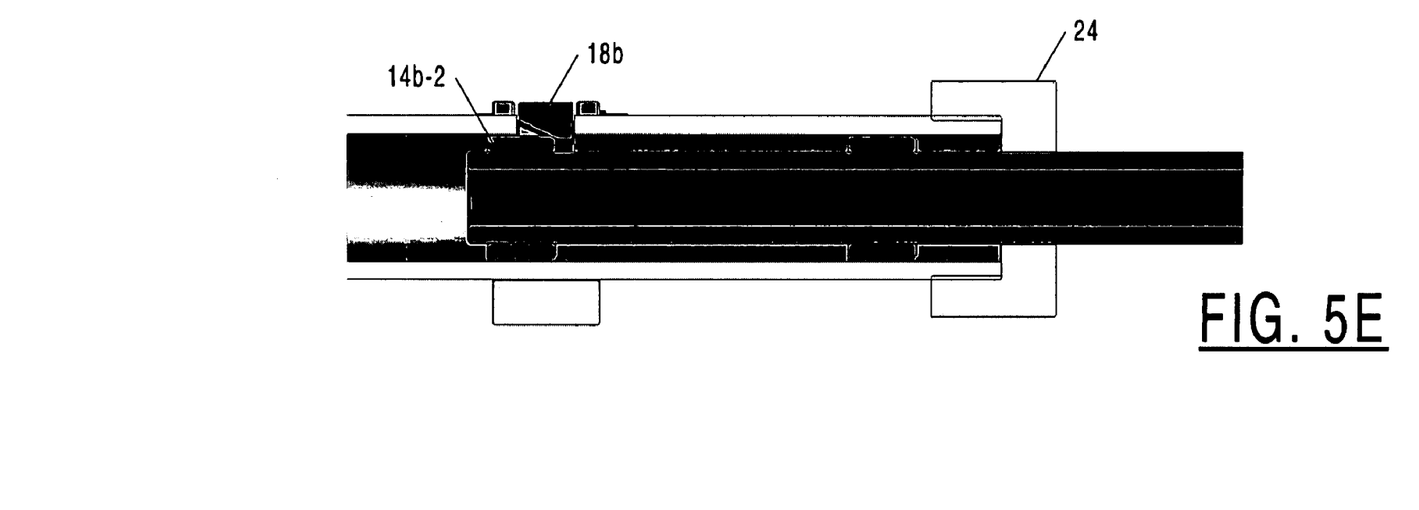
Figure 5F:
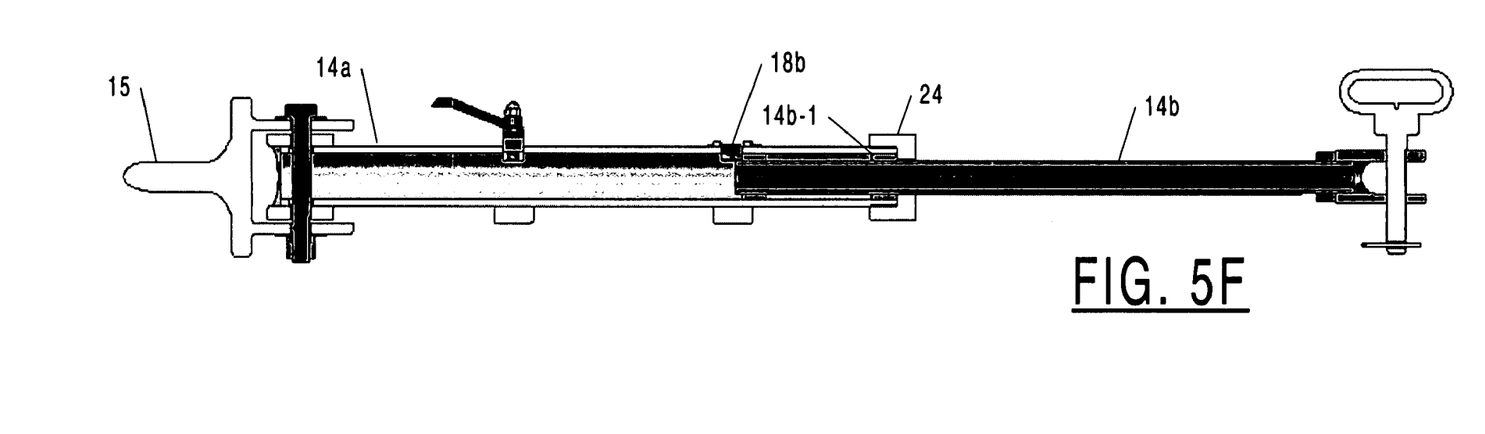
Figure 5G:
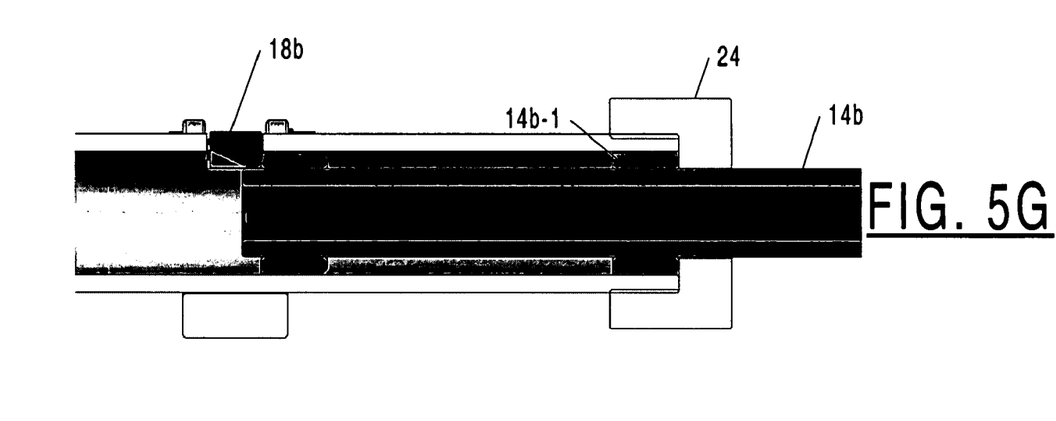

Referring now to FIGS. 5A-F, the telescoping action of the telescoping rod member 14b within the tubular sleeve 14a is shown beginning with the telescoping rod member in the stowed position (FIG. 5A). The handle 20 (FIG. 5B) is twisted by an operator, causing the hitch-end lockbar 18a to raise up and allow the two protuberances 14b-1 and 14b-2 on the telescoping rod member to pass. The far-end protuberance 14b-1 then encounters the far-end lockbar 18b (FIG. 5C), and the pulling action by the operator and a chamfering of the far-end lockbar 18b and also a chamfering on the far-end protuberance 14b-1 urge the spring-loaded far-end lockbar into a raised position, allowing the far-end protuberance to pass (FIG. 5D). This action repeats as the hitch-end protuberance 14b-2 passes the far-end lockbar (FIG. 5E). The telescoping rod member is then in the fully extended position, and locked there by the far-end lockbar, which snaps back to the down position after each protuberance passes on the way to the extended position (FIGS. 5F and 5G).

Besides having an eyelet to attach to a pintle hitch, a towbar according to the invention can of course have coupler means for attaching to other kinds of hitches. For example, the towbar can have a receiver cup for placing on top of a ball hitch.

Also, a towbar according to the invention can be provided so that each tubular sleeve has only one lockbar, the lockbar (preferably spring-loaded) for locking the telescoping rod member in the fully extended position, and the telescoping rod member a single corresponding protuberance.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
   a coupler, for coupling to a hitch on the rear end of a towing vehicle;
   two arms, each pivotally attached to the coupler at a respective pivot end, and each terminating at the other end in a means for attaching to attachment points on the front of a vehicle to be towed;
   wherein each arm includes a telescoping rod of circular cross section and a tubular sleeve member also of circular cross section, provided in a telescoping arrangement so as to allow varying the length of the arm; and wherein each telescoping rod includes a hitch-end protuberance and a far-end protuberance, and each tubular sleeve member has a hitch-end lockbar and a far-end lockbar.

2. An apparatus as in claim 1, wherein each arm also includes means for automatically locking at a predetermined length when extended to the predetermined length.

3. An apparatus as in claim 1, wherein each arm also includes means for automatically locking into a stowed position.

4. An apparatus as in claim 1, wherein each of the two arms terminates at the pivot end in a partial toothed wheel forming a gear element with the two partial toothed wheels in combination forming a gear, and the respective gear elements engage each other so as to prevent one arm from pivoting without the other arm pivoting an equal amount.

5. An apparatus as in claim 2, wherein the far-end lockbar comprises:
   a chamfered hitch-end face;
   a vertical far-end face;

means for automatically restoring the far-end lockbar to a locked position; and means for manually unlocking the far-end lockbar;

wherein as the telescoping rod telescopes out from the tubular sleeve member, the telescoping rod lifts and unlocks the far-end lockbar as a result of the protuberances pushing against the chamfered face of the far-end lockbar, thereby allowing rearward travel of the telescoping rod.

6. The apparatus of claim 5, wherein the means for automatically locking at a predetermined length comprises:

the far-end lockbar;

the means for automatically restoring the far-end lockbar to a locked position; and a far-end stop disposed at the far-end of the tubular sleeve and having an aperture larger in diameter than the telescoping rod but smaller in diameter than the far-end protuberance;

wherein the far-end lockbar is disposed and oriented along the tubular sleeve member and provided so that when the far-end lockbar returns to a locked position following the hitch-end protuberance clearing the far-end lockbar as the telescoping rod is pulled out of the sleeve member, the telescoping rod is mechanically prevented from further travel outward from the sleeve member by the far-end stop opposing further outward travel of the far-end protuberance.

* * * * *

UNITED STATES PATENT AND TRADEMARK OFFICE
CERTIFICATE OF CORRECTION

PATENT NO. : 7,390,007 B2  Page 1 of 1
APPLICATION NO. : 11/447687
DATED : June 24, 2008
INVENTOR(S) : James Helms et al.

It is certified that error appears in the above-identified patent and that said Letters Patent is hereby corrected as shown below:

On title page item (73), under "Assignee", "Bulter" should be --Butler--.

Signed and Sealed this

Ninth Day of September, 2008

JON W. DUDAS
*Director of the United States Patent and Trademark Office*